United States Patent
Menke et al.

(10) Patent No.: US 8,679,996 B2
(45) Date of Patent: Mar. 25, 2014

(54) SPINEL OPTOCERAMICS

(75) Inventors: Yvonne Menke, Mainz (DE); Peter Blaum, Bodenheim (DE); Ulrich Peuchert, Bodenheim (DE); Yoshio Okano, Tsokuba Ibaraki (JP)

(73) Assignee: Schott AG, Mainz (DE)

( * ) Notice: Subject to any disclaimer, the term of this patent is extended or adjusted under 35 U.S.C. 154(b) by 283 days.

(21) Appl. No.: 12/948,933

(22) Filed: Nov. 18, 2010

(65) Prior Publication Data

US 2011/0143911 A1 Jun. 16, 2011

(30) Foreign Application Priority Data

Nov. 20, 2009 (DE) .......................... 10 2009 055 987

(51) Int. Cl.
| | | |
|---|---|---|
| C04B 35/04 | (2006.01) | |
| C04B 35/48 | (2006.01) | |
| C04B 35/49 | (2006.01) | |
| C04B 35/00 | (2006.01) | |

(52) U.S. Cl.
USPC .......................... 501/120; 501/105; 501/153

(58) Field of Classification Search
USPC ............ 501/10, 102, 105, 153, 118, 119, 120
See application file for complete search history.

(56) References Cited

U.S. PATENT DOCUMENTS

| | | |
|---|---|---|
| 3,516,839 A | 6/1970 | Bruch |
| 3,531,308 A | 9/1970 | Bagley |
| 3,767,745 A | 10/1973 | Gazza et al. |
| 3,974,249 A | 8/1976 | Roy et al. |
| 4,273,587 A | 6/1981 | Oda et al. |
| 4,584,151 A | 4/1986 | Matsui et al. |
| 5,082,739 A | 1/1992 | Roy et al. |
| 5,756,408 A * | 5/1998 | Terashi et al. ..................... 501/8 |

(Continued)

FOREIGN PATENT DOCUMENTS

| | | |
|---|---|---|
| CN | 101343173 A | 1/2009 |
| DE | 601 18 514 T2 | 8/2006 |

(Continued)

OTHER PUBLICATIONS

Mathur et al. Single-Source Sol-Gel Synthesis of Nanocrystalline ZnAl2O4: Structural and Optical Properties. J Am Ceram Soc, 84 [9]. 1921-28. 2001.*

(Continued)

*Primary Examiner* — Noah Wiese
(74) *Attorney, Agent, or Firm* — Harness, Dickey & Pierce, P.L.C.

(57) ABSTRACT

A transparent, polycrystalline ceramic is described. The ceramic comprises crystallites of the formula $A_xC_uB_yD_v E_zF_w$, whereby A and C are selected from the group consisting of $Li^+$, $Na^+$, $Be^{2+}$, $Mg^{2+}$, $Ca^{2+}$, $Sr^{2+}$, $Ba^{2+}$, $Al^{3+}$, $Ga^{3+}$, $In^{3+}$, $C^{4+}$, $Si^{4+}$, $Ge^{4+}$, $Sn^{2+/4+}$, $Sc^{3+}$, $Ti^{4+}$, $Zn^{2+}$, $Zr^{4+}$, $Mo^{6+}$, $Ru^{4+}$, $Pd^{2+}$, $Ag^{2+}$, $Cd^{2+}$, $Hf^{4+}$, $W^{4+/6+}$, $Re^{4+}$, $Os^{4+}$, $Ir^{4+}$, $Pt^{2+/4+}$, $Hg^{2+}$ and mixtures thereof, B and D are selected from the group consisting of $Li^+$, $Na^+$, $K^+$, $Mg^{2+}$, $Al^{3+}$, $Ga^{3+}$, $In^{3+}$, $Si^{4+}$, $Ge^{4+}$, $Sn^{4+}$, $Sc^{3+}$, $Ti^{4+}$, $Zn^{2+}$, $Y^{3+}$, $Zr^{4+}$, $Nb^{3+}$, $Ru^{3+}$, $Rh^{3+}$, $La^{3+}$, $Lu^{3+}$, $Gd^{3+}$ and mixtures thereof, E and F are selected mainly from the group consisting of the divalent anions of S, Se and O and mixtures thereof, x, u, y, v, z and w satisfy the following formulae $$0.125 < (x+u)/(y+v) \le 0.55 \quad z+w=4$$

and at least 95% by weight of the crystallites display symmetric, cubic crystal structures of the spinel type, with the proviso that when $A=C=Mg^{2+}$ and $B=D=Al^{3+}$, E and F cannot both be O.

18 Claims, 4 Drawing Sheets

(56) References Cited

U.S. PATENT DOCUMENTS

| | | | |
|---|---|---|---|
| 6,632,758 B2 * | 10/2003 | Beall et al. ..................... | 501/10 |
| 6,908,872 B2 | 6/2005 | Tanaka et al. | |
| 7,710,656 B2 | 5/2010 | Peuchert et al. | |
| 2004/0142809 A1 * | 7/2004 | Pinckney ........................ | 501/10 |
| 2008/0164626 A1 | 7/2008 | Zimmer et al. | |

FOREIGN PATENT DOCUMENTS

| | | |
|---|---|---|
| DE | 10 2007 002 079 A1 | 7/2008 |
| DE | 10 2007 022 048 A1 | 11/2008 |
| EP | 0 334 760 B1 | 5/1993 |
| EP | 0 447 390 B1 | 2/1994 |
| EP | 0 332 393 B1 | 6/1994 |
| EP | 1 701 179 A1 | 9/2006 |
| EP | 1 992 599 B1 | 11/2008 |
| GB | 2 031 339 A | 4/1980 |
| JP | 4016552 A | 1/1992 |
| JP | 2000-203933 A | 7/2000 |
| JP | 2010-30798 | 2/2010 |
| WO | WO 2006/104540 A2 | 10/2006 |
| WO | WO 2008/090909 A1 | 7/2008 |

OTHER PUBLICATIONS

Ya-ming Ji et al.; Materials Letters 59; Preparation and spectroscopic properties of La2Hf2O7:Tb; 2005; pp. 868-871.

Deborah D. Silva et al.; Industrial Developments in the Field of Optically Transparent Inorganic Materials: A Survey of Recent Patents; 2008; pp. 56-73.

Hans Bach et al.; The Properties of Optical Glass; 1998; 24 pages.

Yaming Ji et al.; La2Hf2O7:Ti4+ ceramic scintillator for x-ray imaging; Mar. 2005; pp. 567-570.

Ya-ming Ji et al.; Fabrication and Spectroscopic Investigation of La2Hf2O7-Based Phosphors; 2005; pp. 577-579.

Alison A. DaSilva et al., Characterization of nanosized ZnAl2O4 spinel synthesized by the sol-gel method; J. Sol-Gel Sci Technol, vol. 49; pp. 101-105.

* cited by examiner

SPINEL OPTOCERAMICS

CROSS-REFERENCES TO RELATED APPLICATIONS

This application claims priority from German patent application 10 2009 055 987.6, filed on Nov. 20, 2009. The entire content of this priority application is incorporated herein by reference.

BACKGROUND OF THE INVENTION

The present invention relates to optoceramics, their use and methods for their manufacture. The present invention further relates to refractive, diffractive or transmittive optical elements made of optoceramics as well as imaging optics comprising such optical elements.

For the purposes of the present invention, the term "optoceramic" refers to an essentially single-phase polycrystalline oxide-based material having a high transparency. Optoceramics are accordingly understood to be a specific subgroup of ceramics.

For the purposes of the present invention, the term "single-phase" means that more than 95% of the material, preferably at least 97%, more preferably at least 99% and particularly preferably from 99.5 to 99.9%, of the material is present in the form of crystals having the target composition. The individual crystallites are closely packed and densities of at least 99%, preferably 99.9% and more preferably 99.99%, based on the theoretical values are achieved. The optoceramics are thus virtually pore-free.

Optoceramics differ from conventional glass-ceramics in that the latter comprise not only a crystalline phase but also a high proportion of an amorphous glass phase. Furthermore, conventional ceramics do not have the high densities present in optoceramics. Neither glass-ceramics nor conventional ceramics can have the advantageous properties of optoceramics, such as particular refractive indices, Abbe numbers, values for relative partial dispersion and especially the advantageous high transparency for light in the visible range and/or in the infrared range.

A main objective in the development of imaging optics is to achieve a satisfactory optical quality at a compact and very light structure of the optics. Particularly for applications in digital image recording in electronic appliances, such as for example in lenses of digital cameras or in cameras built into mobile telephones, etc, the imaging optics have to be very small and light. In other words, the total number of imaging lens components should be kept to a minimum. This requires transparent materials having a high refractive index and/or very low dispersion so as to make it possible to design very compact imaging optics with approximately apochromatic imaging behaviour. In microscopy, virtually diffraction-limited imaging optics are required, both for ocular lenses and for objective lenses.

For night vision instruments, IR lenses and IR spectral systems, transparent optics which have a high transmission both in the visible spectral range (from 380 to 800 nm) and in the near IR to far infrared spectral range up to 7000 nm, preferably up to 10 000 nm, are required. In addition, these optics have to be particularly resistant to external influences such as mechanical stresses, shocks, temperature changes, pressure changes and if appropriate aggressive chemicals.

Materials as described above can also be employed in other technologies, such as for example digital projection or display techniques in general and also in predominantly monochromatic applications such as optical storage technologies, in which, for example, compact systems are achieved with the aid of materials having a high refractive index.

Owing to their stability to high temperatures as well as aggressive chemicals, optoceramics are also suitable for producing windows in high-temperature applications, e.g. inspection windows for high-temperature furnaces, and also as encapsulation material for alkali metal vapour lamps.

At present, the development of imaging optics is limited by the optical parameters of the available materials. The available glass melting and glass forming techniques make it possible to produce only those types of high-quality glass which, in an Abbe diagram in which the refractive index is plotted against the Abbe number, are below a line which runs approximately through the points Abbe number=80/refractive index=1.7 and Abbe number=10/refractive index=2.0. Such an Abbe diagram is shown by way of example in FIG. 1, where the above-described imaginary line is denoted by a broken line. More precisely, glasses having a refractive index in the range from about 1.9 to about 2.2 and an Abbe number in the range from 30 to 40 tend to be unstable, which makes it very difficult to produce such glasses in relatively large quantities and satisfactory quality. Likewise, glasses having a refractive index in the range from about 1.8 to about 2.1 and an Abbe number in the range from about 35 to 55 tend to be unstable.

The definitions of refractive index (refractive index at a wavelength of 587.6 nm) $n_D$, Abbe number $v_d$ and relative partial dispersion (for example $P_{g,F}$) are, in principle, known per se to those skilled in the art. More precise descriptions of these terms can be found in the technical literature. For the purposes of the present invention, the terms are used in accordance with the definitions in "The properties of optical glass"; Bach, Hans; Neuroth, Norbert (Editors), Berlin (inter alia): Springer, 1995; or Schott, "Series on glass and glass ceramics", science, technology and applications; 1, XVII, page 410, 2nd, corr. print., 1998, XVII, page 414.

For the present purposes, the transparency to visible light or to infrared radiation is the pure transmission.

Apart from the requirements in terms of transparency, refractive index and Abbe number, the relative partial dispersion plays a large role in the choice of an optical medium. To produce virtually apochromatic optics, a combination of materials having virtually identical relative partial dispersion but a large difference in the Abbe number is necessary. When the partial dispersion $P_{g,F}$ is plotted against the Abbe number, most glasses lie on a line ("normal line"). Such a diagram is shown by way of example in FIG. 2. To produce apochromatic optics, materials whose combination of Abbe number and relative partial dispersion deviates from this behaviour are thus desirable.

Figure 1:
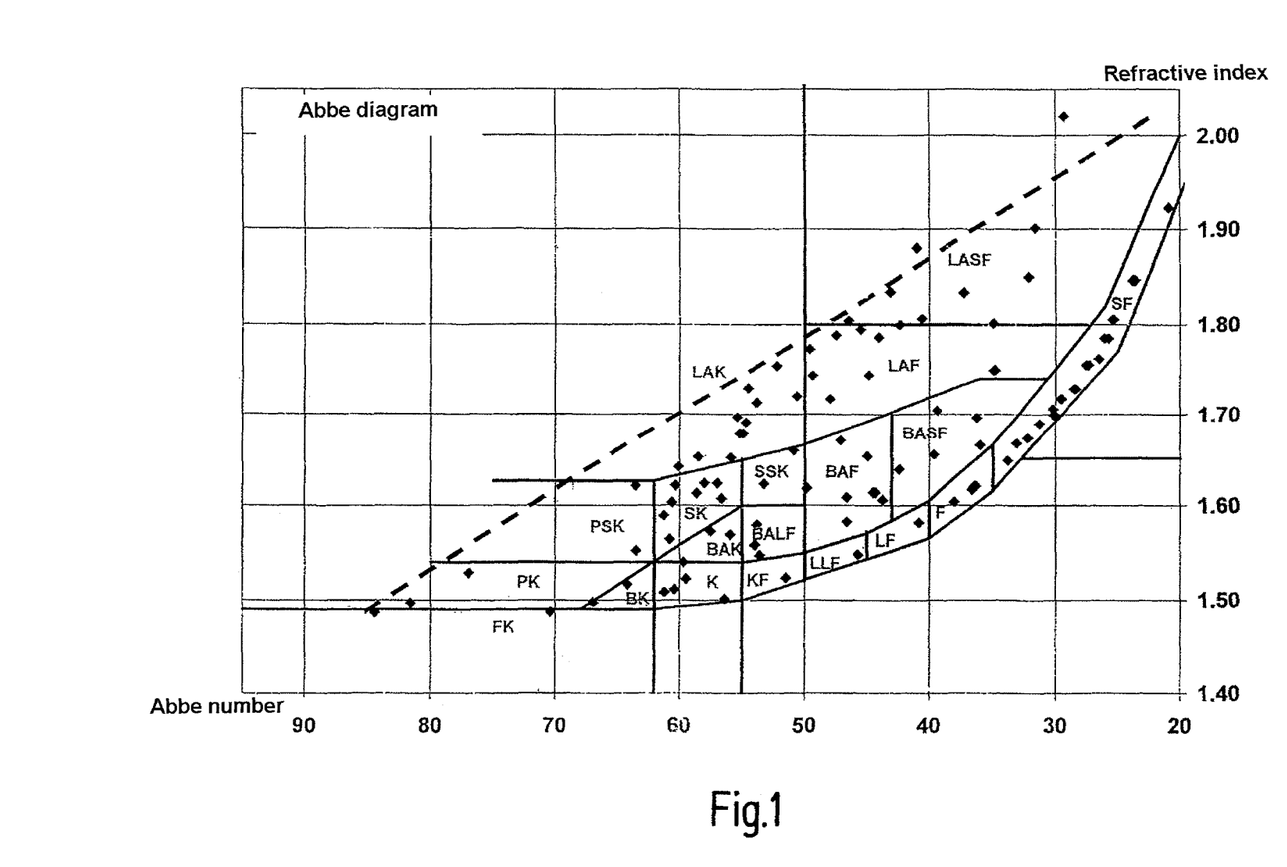
FIG. 1 shows a diagram in which the refractive index is plotted against the Abbe number.

Materials which in the Abbe diagram shown in FIG. 1, are above the abovementioned imaginary line are at present exclusively single crystals or polycrystalline materials.

However, the production of single crystals by the known crystal drawing processes is very costly and subject to considerable restrictions in respect of the chemical composition. Furthermore, single crystals cannot be produced with a shape close to the end shape for most applications, resulting in a considerable outlay for final machining, possibly in combination with a high removal of material. This also means that it is frequently necessary to produce single crystals which are significantly larger than the optical element desired in the end.

Although polycrystalline ceramics can be produced over a broader composition range, they frequently have unsatisfactory optical qualities, in particular as far as the homogeneity of the refractive index and the transparency are concerned.

Only few composition ranges and structure types in which transparent ceramics having a satisfactory optical quality can be produced have been known hitherto.

Polycrystalline ceramics have therefore been used only to a limited extent in optical applications up to now.

The Japanese published specification JP 2000-203933 discloses, for example, the production of polycrystalline YAG by means of a specific sintering process. Furthermore, the production of polycrystalline YAG of optical quality, for example for doping with laser-active ions such as Nd, has recently also been successful.

U.S. Pat. No. 6,908,872 describes a translucent ceramic which must contain barium oxide as a necessary constituent of the ceramic. The ceramics have a perovskite structure and are paraelectric. However, ceramics which contain such barium-containing phases having a perovskite structure often have an unsatisfactory optical imaging quality. This results from the tendency of many perovskites to form distorted ferroelectric crystal structures and thus lose their optical isotropy. This leads, inter alia, to undesirable double refraction of the crystals of which the ceramic is made up. Furthermore, it has been found that the transmission of the ceramics in the region of blue light (around 380 nm) is unsatisfactory.

Ji et al. ("$La_2Hf_2O_7$: $Ti^{4+}$ Ceramic scintillator for X-ray imaging", J. Mater Res. Vol. 20 (3) 567-570 (2005)) describe transparent ceramics having the composition $La_2Hf_2O_7$. The material described there is doped with titanium. Further ceramics of this type which are doped with other dopants such as $Eu^{4+}$, $Tb^{3+}$ or $Ce^{3+}$ are described, for example, in Ji et al. ("Preparation and spectroscopic properties of $La_2Hf_2O_7$ Tb" Materials Letters, 59 (8-9), 868-871, April 2005 and "Fabrication and spectroscopic investigation of $La_2Hf_2O_7$-based phosphors". High Performance Ceramics III, parts 1 and 2, 280-283; 577-579 1:2). Furthermore, the abovementioned authors have also described undoped variants of the abovementioned compounds ("Fabrication of transparent $La_2Hf_2O_7$ ceramics from combustion synthesized powders" Mat. Res. Bull. 40 (3) 553-559 (2005)).

None of the abovementioned publications describes the use of the materials as lens material; only the use as detector material for CT instruments is reported. Although the optical quality displayed by the compounds may be satisfactory for the desired use as detector material for CT instruments, it is unsatisfactory for precise imaging of an object by means of an optical system.

Furthermore, EP 1 992 599 A1, in the name of the present applicant, discloses optical elements and imaging optics based on pyrochlore ceramics of various compositions.

More recent developments in patents in the field of optically transparent inorganic ceramic materials are summarized, for example, in the review article by Silva et al. (Recent Patents on Material Science 2008, 1, 56-73). This article describes optically transparent inorganic materials which include aluminium oxides, aluminium oxynitrides, perovskites, yttrium aluminium garnets, PLZT ceramics, Mg—Al spinels, yttrium oxides and REE oxides.

To solve the abovementioned problems, spinel ceramics having the composition $MgO$—$Al_2O_3$ have also been taken into consideration for some time. Examples of such ceramics are disclosed, for example, in the following documents, namely U.S. Pat. No. 3,516,839, U.S. Pat. No. 3,531,308, U.S. Pat. No. 4,584,151, EP 0 334 760 B1, U.S. Pat. No. 3,974,249, WO 2006/104540 A2, U.S. Pat. No. 3,767,745, EP 0 447 390 B1, U.S. Pat. No. 5,082,739, EP 0 332 393 A1, U.S. Pat. No. 4,273,587, GB 2,031,339, JP 04016552 and WO 2008/090909. However, the refractive indices of the transparent ceramics based on Mg—Al spinel established at present are in the region of $n_D$=about 1.72 and are not high enough to be able, firstly, to meet the requirements of new fields of application ($n_D$>1.72) and, secondly, to be able to compete with existing glass solutions.

SUMMARY OF THE INVENTION

It is therefore an object of the present invention to provide a material having a high refractive index, a high Abbe number and/or an excellent specific relative partial dispersion as well as a low stress-induced birefringence, where, in particular, these parameters cannot be achieved using conventional glasses, single-crystalline materials and crystalline ceramics or materials. A further objective of the invention is to describe a method for manufacturing a material having the same parameters.

A further objective of the present invention is to provide an optical element which, for example, also has a high transparency in the visible wavelength range and/or in the infrared wavelength range.

A further objective of the present invention is to provide imaging optics having excellent optical parameters and in particular imaging optics having approximately apochromatic imaging behaviour.

It has surprisingly been found that the use of materials having spinel structures of a different type than the composition type $MgAl_2O_4$ allows optoceramics having excellent optical properties, in particular a high refractive index, a high Abbe number as well as an excellent relative partial dispersion, to be obtained. Furthermore, such materials display excellent transparency both in the region of visible light and in the infrared range as well as excellent mechanical, thermal and chemical stability.

The invention therefore relates to an optoceramic comprising crystallites of the formula $A_xC_uB_yD_vE_zF_w$, whereby, A and C are selected from the group consisting of $Li^+$, $Na^+$, $Be^{2+}$, $Mg^{2+}$, $Ca^{2+}$, $Sr^{2+}$, $Ba^{2+}$, $Al^{3+}$, $Ga^{3+}$, $In^{3+}$, $C^{4+}$, $Si^{4+}$, $Ge^{4+}$, $Sn^{2+/4+}$, $Sc^{3+}$, $Ti^{4+}$, $Zn^{2+}$, $Zr^{4+}$, $Mo^{6+}$, $Ru^{4+}$, $Pd^{2+}$, $Ag^{2+}$, $Cd^{2+}$, $Hf^{4+}$, $W^{4+/6+}$, $Re^{4+}$, $Os^{4+}$, $Ir^{4+}$, $Pt^{2+/4+}$, $Hg^{2+}$ and mixtures thereof, B and D are selected from the group consisting of $Li^+$, $Na^+$, $K^+$, $Mg^{2+}$, $Al^{3+}$, $Ga^{3+}$, $In^{3+}$, $Si^{4+}$, $Ge^{4+}$, $Sn^{4+}$, $Sc^{3+}$, $Ti^{4+}$, $Zn^{2+}$, $Y^{3+}$, $Zr^{4+}$, $Nb^{3+}$, $Ru^{3+}$, $Rh^{3+}$, $La^{3+}$, $Lu^{3+}$, $Gd^{3+}$ and mixtures thereof, E and F are selected mainly from the group consisting of the divalent anions of S, Se and O and mixtures thereof, x, u, y, v, z and w satisfy the following formulae $$0.125 < (x+u)/(y+v) \leq 0.55 \quad z+w=4$$

and at least 95% by weight of the crystallites display symmetric, cubic crystal structures of the spinel type, with the proviso that when $A=C=Mg^{2+}$ and $B=D=Al^{3+}$, E and F cannot both be O.

An optoceramic for the purposes of the invention is a ceramic which consists of a crystal composite in which the individual crystallites have a cubic structure of the spinel type. According to the invention, at least 95% by weight of the crystallites, preferably more than 98% and more preferably more than 99% of the crystallites, have symmetric cubic crystal structures of the spinel type. The cubic crystals are preferably present very close to one another as a defect-free microstructure.

All mixed crystal phases have a cubic crystal structure which is isotypic with that of $MgAl_2O_4$. This structure type is described by way of example in E. Riedel, Anorganische Chemie, Walter de Gruyter Berlin, New York (1994).

In the oxides $AB_2O_4$ having a spinel structure, eight negative anions have to be neutralized by the cations, which can be achieved by the following three combinations of cations: $(A^{2+}+2B^{3+}, A^{4+}+2B^{2+}$ and $A^{6+}+2B^{+})$. These compounds are also referred to as 2,3-, 4,2- and 6,1-spinels. In the spinel structure, two thirds of the cations are octahedrally coordinated and one third of the cations is tetrahedrally coordinated. Normal spinels have the ion distribution $A(BB)O_4$, with the ions which occupy octahedral sites being shown in parentheses. Spinels having the ion distribution $B(AB)O_4$ are referred to as inverse spinels. Spinels in which the ion distribution is between these two boundary types are also known. Optoceramics for the purposes of the present invention can have all types of spinel structure, but preference is given to only a single structure type being present in order to avoid refractive index inhomogeneities.

It is also clear that, even though the above statements have been made with reference to binary stoichiometric spinels, the optoceramics of the present invention can also have non-stoichiometric mixed spinel structures as long as these meet the abovementioned conditions.

Owing to their cubic structure, the polycrystalline optoceramics are dielectric. Thus, no permanent dipoles occur and the material behaves optically isotropically.

Apart from the divalent anions of S, Se and O and mixtures thereof, E and F can comprise any other anion as long as the abovementioned divalent anions make up the major part, i.e. at least 50%, of E and F. Customary sources of other anions are, for example, inorganic compounds added as sintering aids, such as $AlF_3$, $MgF_2$ or other fluorides of the metals present in the spinels.

In one embodiment of the invention, A and C are selected from the group consisting of $Li^+$, $Mg^{2+}$, $Ca^{2+}$, $Sr^{2+}$, $Ba^{2+}$, $Al^{3+}$, $Ga^{3+}$, $In^{3+}$, $Ge^{4+}$, $Sc^{3+}$, $Zn^{2+}$, $Zr^{4+}$, $Cd^{2+}$, $Hf^{4+}$ and mixtures thereof, in particular from the group consisting of $Mg^{2+}$, $Ca^{2+}$, $Sr^{2+}$, $Ba^{2+}$, $Sc^{3+}$, $Zn^{2+}$, $Cd^{2+}$, $Hf^{4+}$ and mixtures thereof, and particularly preferably from the group consisting of $Mg^{2+}$, $Ca^{2+}$, $Sr^{2+}$, $Zn^{2+}$ and mixtures thereof.

In a further embodiment, B and D are selected from the group consisting of $Li^+$, $Na^+$, $K^+$, $Mg^{2+}$, $Al^{3+}$, $Ga^{3+}$, $In^{3+}$, $Sc^{3+}$, $Zn^{2+}$, $Y^{3+}$, $Zr^{4+}$, $Nb^{3+}$, $Ru^{3+}$, $Rh^{3+}$, $La^{3+}$, $Gd^{3+}$ and mixtures thereof, in particular from the group consisting of $Mg^{2+}$, $Al^{3+}$, $Ga^{3+}$, $In^{3+}$, $Sc^{3+}$, $Zn^{2+}$, $Y^{3+}$, $Nb^{3+}$, $Ru^{3+}$, $Rh^{3+}$, $La^{3+}$, $Gd^{3+}$ and mixtures thereof, and particularly preferably from the group consisting of $Al^{3+}$, $Ga^{3+}$, $In^{3+}$, $Y^{3+}$, $La^{3+}$, $Gd^{3+}$ and mixtures thereof.

It has been found that optoceramics which comprise the abovementioned cations have particularly advantageous properties and very particularly advantageous optical properties. Optoceramics which comprise the abovementioned cations have, in particular, a high refractive index and a high Abbe number.

In a further embodiment of the invention, x, u, y and v satisfy the following relationship $0.3<(x+u)/(y+v)\leq0.55$, in particular $0.4<(x+u)/(y+v)\leq0.5$ and particularly preferably $0.45<(x+u)/(y+v)\leq0.5$. In particular, the crystallites have a stoichiometric composition in which the following applies:

$x+u=1$, $y+v=2$, $z+w=4$ and $2x+2u+3y+3v=8$.

Ceramics which fall within the abovementioned parameters likewise have particularly advantageous properties, in particular advantageous optical properties.

In a further embodiment of the invention, E and F comprise at least 90%, preferably at least 95% and particularly preferably at least 98%, divalent anions of S, Se and O and mixtures thereof.

Even though the optoceramics of the invention can comprise further anions which result, for example from inorganic compounds added to improve sintering, preference is given, in particular in respect of the optical isotropy, to E and F being divalent anions of S, Se and O to the greatest possible extent.

In a further embodiment of the invention, the optoceramic has a transparency of >50%, preferably >70%, more preferably >80%, more preferably >90%, particularly preferably >95%, in a window having a width of at least 200 nm in the region of visible light having wavelengths from 380 nm to 800 nm, preferably in a window from 450 to 750 nm or in a window from 600 to 800 nm, at a sample thickness of 2 mm, preferably at a sample thickness of 3 mm, particularly preferably at a sample thickness of 5 mm.

In a further embodiment of the invention, the optoceramic has a transparency of >50%, preferably >70%, more preferably >80%, more preferably >90%, particularly preferably >95%, in a window having a width of at least 1000 nm in the infrared range from 800 nm to 5000 nm, preferably in a window from 3000 to 4000 nm, at a sample thickness of 2 mm, preferably at a sample thickness of 3 mm, particularly preferably at a sample thickness of 5 mm.

Optoceramics having the abovementioned transparency parameters have been found to be particularly advantageous for, in particular, applications in the field of night vision systems, IR lenses and IR spectral systems.

In a further embodiment of the invention, the optoceramic has a refractive index which is greater than 1.72, preferably from 1.74 to 2.3 and particularly preferably from 1.75 to 2.0.

In a further embodiment of the invention, the optoceramic has an Abbe number of 40 to 80, preferably 50 to 70.

In a further embodiment of the invention, the optoceramic has a stress-induced birefringence of <20 nm/cm, preferably <10 nm/cm and in particular <5 nm/cm.

The invention further relates to a method for manufacturing an optoceramic of the invention, which comprises the following steps:

(1) production of a homogeneous powder mixture by mixing the powder raw materials having an average primary particle diameter of 20 nm to 1 preferably 20 to 500 nm, in accordance with the desired composition, optionally with the addition of additives such as binders, sintering aids and dispersants in a solvent and drying the slurry to give a powder, (2) production of a preform from the powder obtained in step (1), (3) optionally burning-out of any dispersants and binders present from the preform at temperatures of 500 to 900° C., (4) sintering the preform at temperatures of 1400 to 1900° C., (5) optionally pressure sintering the sintered body obtained in step (4) at 1400 to 2000° C. under a pressure of 10 to 300 MPa, preferably 50 to 250 MPa and in particular 100 to 200 MPa, and (6) optionally oxidation of the optoceramic obtained in step (4) or (5) in a stream of $O_2$ at temperatures of up to 1000° C. for 5 to 10 hours in order to remove any discoloration which may occur.

The amounts of powder used in step (1) of the method can readily be determined by a person skilled in the art from the desired stoichiometry of the end product. Ideally, the compositions deviate by not more than 10 mol %, ideally not more than 5 mol %, from the target composition. Here, too much or too little of one of the oxides can ideally be compensated by the crystal structure within the limits of complete miscibility. Powders used are either individual oxides which after homogenization and sintering have the final stoichiometry or compound powders which already have the final stoichiometry before sintering.

The solvents used in step (1) can be any solvent known to those skilled in the art. Preference is given to using water, short-chain alcohols or mixtures thereof. Particularly preferred solvents are water, ethanol, isopropanol and mixtures thereof.

The sintering in step (4) is preferably carried out under reduced pressure or under an $H_2/N_2$ gas mixture; vacuum sintering takes place in a pressure range from 1 bar absolute to $10^{-7}$ mbar absolute, preferably in a pressure range from $10^{-3}$ to $10^{-7}$ mbar.

Since the optoceramics of the invention are intended for the production of passive optical elements, fluorescence has to be deliberately suppressed during production. Thus, the content of optically active impurities (for example active ions from the group of the rare earths or the transition metals) has to be kept as low as possible in step (1). The content of optically active ions is preferably <100 pm, more preferably <10 ppm and particularly preferably <1 ppm. The optoceramics are ideally completely free of optically active ions.

The invention further relates to an optical element which comprises an optoceramic according to the invention. This optical element is preferably a window or a lens.

The optical element of the invention can be a refractive, transmittive or diffractive optical element, preferably a refractive or diffractive optical element.

The invention further relates to an optical imaging system which comprises at least one optical element according to the invention.

The invention further relates to the use of the optoceramic of the invention for the production of an optical element.

It goes without saying that the abovementioned features and the features still to be explained below cannot only be used in the combination indicated but also in other combinations or on their own, without leaving the scope of the present invention.

BRIEF DESCRIPTION OF THE DRAWINGS

The invention will now be illustrated in more detail with the aid of examples and with reference to the accompanying figures. In the figures.

DESCRIPTION OF PREFERRED EMBODIMENTS

Figure 2:
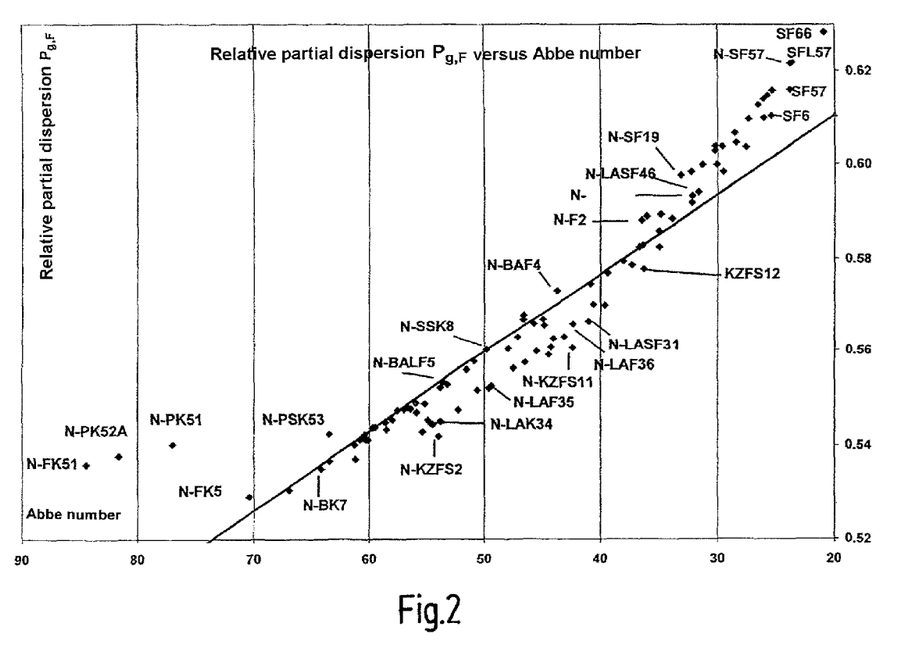
FIG. 2 shows a diagram in which the partial dispersion $P_{g,F}$ is plotted against the Abbe number.

FIGS. 1 and 2 show, as described above, diagrams in which the refractive index and the partial dispersion $P_{g,F}$, respectively, are plotted against the Abbe number for various conventional glasses.

The broken line shown in FIG. 1 indicates an imaginary line above which it becomes difficult to produce glasses in a sufficient amount and satisfactory quality. Optoceramics of the spinel type have refractive indices and Abbe numbers which lie above the broken line.

In FIG. 2, relative partial dispersions of optical glasses used at present are plotted against their Abbe number. As can be seen from FIG. 2, the relative partial dispersions for most glasses, relative to the Abbe number, are located around a straight line drawn as a solid line in FIG. 2. To produce apochromatic optics, it is advantageous for the optical elements made of optoceramics of the spinel type to be located as far as possible from this line.

Figure 3:
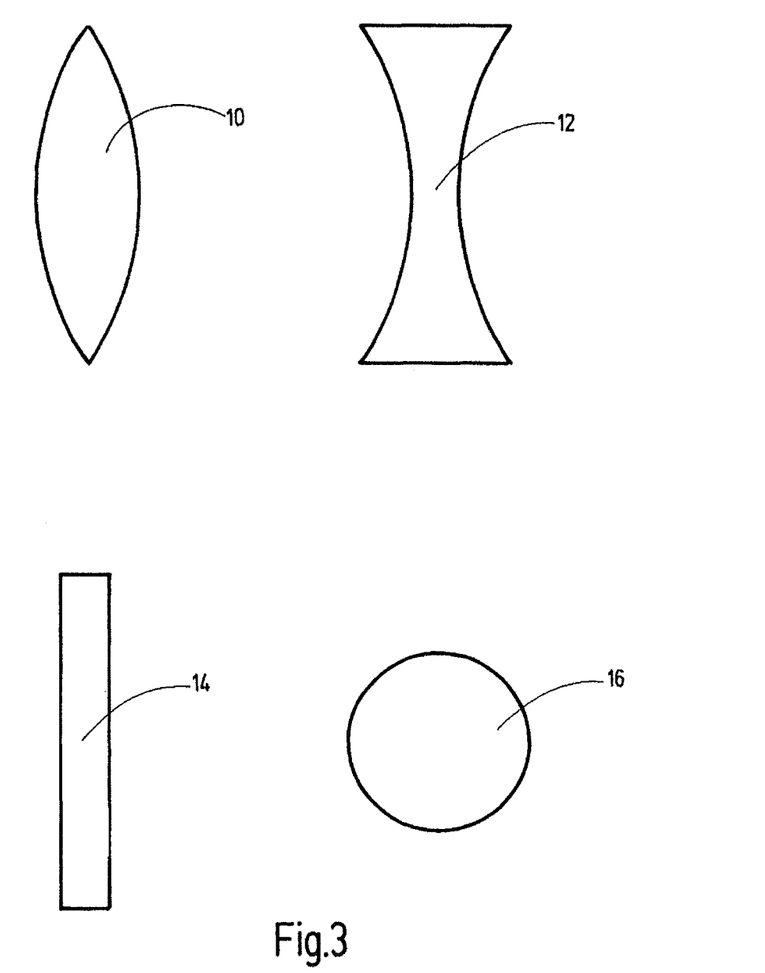
FIG. 3 shows four examples of optical elements according to the invention.

FIG. 3 shows four examples of optical elements made of optoceramics of the spinel type. The reference numeral 10 denotes a biconvex lens, while the reference numeral 12 denotes a biconcave lens. The optical element denoted by the reference numeral 14 is a transmittive optical element, also referred to as a window. The reference numeral 16 denotes a spherical lens.

Figure 4:
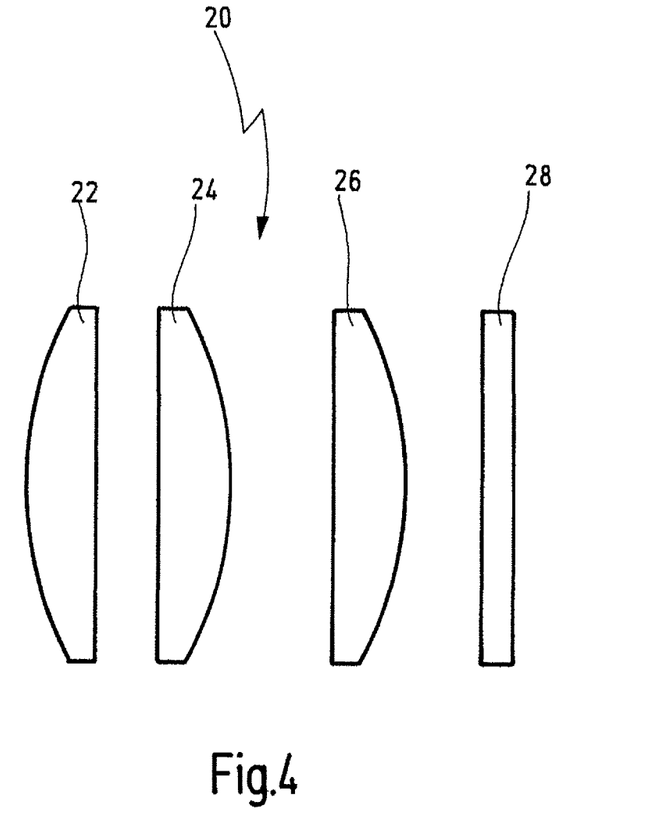
FIG. 4 shows, highly schematically, imaging optics according to the invention.

FIG. 4 shows, highly schematically, imaging optics 20, which in this case is a lens for a camera installed in a mobile telephone. The imaging optics consists of three individual lenses 22, 24 and 26 of which one, two or all three can consist of optoceramics of the spinel type. In addition to the lenses, an IR filter 28 is also present.

The production of optoceramics of the spinel type will now be illustrated with the aid of Examples 1 to 6 below.

Production of Transparent Ceramics

Example 1

Production of a Transparent Ceramic Composed of $ZnAl_2O_4$ by Dry Pressing

Powders having primary particles having diameters of <1 μm, preferably diameters of ≤250 nm, of ZnO and $Al_2O_3$ are weighed out in a ratio corresponding to the target composition and mixed and homogenized in a ball mill. Milling is carried out in ethanol using $Al_2O_3$ balls, with binders, dispersant additives (surfactants) and further auxiliaries known to those skilled in the art being added to the suspension being milled. Milling is carried out overnight.

The milled suspension is either dried on a rotary evaporator or granulated in a spray drier.

The powder is subsequently uniaxially pressed to give discs. The shapes are preferably such that at least one surface reproduces the contour of the finished lens. The pressure conditions are in the range from 10 to 50 MPa, and the pressing times range from a few seconds to 1 minute. The preshaped compact is repressed in a cold isostatic press using a pressing pressure in the range from 100 to 300 MPa. The pressure transmission medium is oil.

Any binder present is subsequently burnt out in a first thermal step. Heating time and temperature are 180 minutes and 700° C. The burnt-out green body is subsequently sintered in a vacuum sintering furnace (reduced pressure: $10^{-5}$-$10^{-6}$ mbar), if desired in hydrogen or helium. The sintering temperatures and times depend on the melting points or phase formation temperatures of the target composition. In the case of $ZnAl_2O_4$, these are about 1850° C./5 h.

In the subsequent hot isostatic pressing (HIP), the closed pores are eliminated. The HIP conditions are, for example, 1750° C.-60 min-Ar-200 MPa. Depending on the chemistry and the susceptibility of the system to reduction, the sample can be reoxidized in a further thermal step (e.g. 900° C., 5 hours, air) after the hot isostatic pressing.

Optically transparent and homogeneous bodies which can be processed further to produce lenses are obtained.

Example 2

Production of a Transparent Ceramic Composed of (Mg,Zn)Al$_2$O$_4$ by Hot Casting In a heated ball mill, the ceramic nanosize MgO, ZnO, Al$_2$O$_3$ powder mixture is mixed with the thermoplastic binder (mixture of 75% by mass of paraffin and 25% by mass of microwax), the sintering aid(s) and the surface-active agent siloxane polyglycol ether (monomolecular coverage of the ceramic particle surface) at 80° C. Here, the viscosity of the final slip is 2.5 Pas at a solids content of 60% by volume. The slip is conveyed directly into the plastic mould held against the mill by means of an injection pressure of 1 MPa (hot casting). After removal from the mould, the binder is driven off at temperatures above the melting point of the wax used, leaving about 3% by mass in the green body in order to ensure dimensional stability. The binders and surfactants which now remain in the green body are burnt out at 600° C. for 3 hours.

Vacuum sintering is carried out at a heating rate of 300 K/h up to 1650° C. and a hold time of 10 hours. The vacuum conditions are from $10^{-5}$ to $10^{-6}$ mbar. HIPping is carried out at a heating rate of 300 K/min up to 1730° C. and a hold time of 10 hours under a pressure of 200 MPa. Post-annealing at a temperature of 1100° C. is carried out in air at a heating rate of 150 K/h.

Example 3

Production of a Transparent Ceramic Composed of (Zn,Sr)(Sc,Al)$_2$O$_4$ by Uniaxial Pressing Powders having primary particles having diameters of <1 μm, preferably diameters of ≤250 nm, of ZnO, SrO, Sc$_2$O$_3$ and Al$_2$O$_3$ are weighed out in a ratio corresponding to the target composition. After the addition of dispersants, sintering aids and binders, the mixture is mixed with ethanol and Al$_2$O$_3$ balls in a ball mill for from 12 to 16 hours.

The milled suspension is either dried on a hotplate or on a rotary evaporator or granulated in a spray drier.

The powder is subsequently uniaxially pressed to form discs. The shapes are preferably such that at least one surface reproduces the contour of the finished lens. The pressure conditions are in the range from 10 to 50 MPa, and the pressing times range from a few seconds to 1 minute. The preshaped compact is repressed in a cold isostatic press using a pressing pressure of 100 to 300 MPa. The pressure transmission medium is water or oil.

Any binder present is subsequently burnt out in a first thermal step. The heating time is 1-3 hours at temperatures in the range from 600 to 1000° C. The burnt-out green body is subsequently sintered in a vacuum sintering furnace (reduced pressure: $10^{-5}$-$10^{-6}$ mbar), if desired in hydrogen or helium. The sintering temperatures and times depend on the sintering behaviour of the mixture, i.e. after the formation of the composition, a further densification to give a ceramic having few or no pores takes place. Sintering to give a virtually pore-free body is carried out at higher temperatures in the range from 1600 to 1900° C. for 2 to 10 hours.

In the subsequent hot isostatic pressing (HIP), the closed pores are eliminated; the HIP conditions are, for example, 1780° C.-2 h-Ar-200 MPa. Depending on the chemistry and the susceptibility of the system to reduction, the sample can be reoxidized in a further thermal step (e.g. 1000° C., 5 hours, O$_2$ stream) after the hot isostatic pressing.

Optically transparent and homogeneous bodies which can be processed further to produce lenses are obtained.

Example 4

Production of a Transparent Ceramic Composed of SrAl$_2$O$_4$ by Hot Casting In a heated ball mill, the ceramic nanosize SrO and Al$_2$O$_3$ powder mixture is mixed with the thermoplastic binder (mixture of 75% by mass of paraffin and 25% by mass of microwax), the sintering aid(s) and the surface-active agent siloxane polyglycol ether (monomolecular coverage of the ceramic particle surface) at 80° C. Here, the viscosity of the final slip is 2.5 Pas at a solids content of 60% by volume. The slip is conveyed directly into the plastic mould held against the mill by means of an injection pressure of 1 MPa (hot casting). After removal from the mould, the binder is driven off at temperatures above the melting point of the wax used, leaving about 3% by mass in the green body in order to ensure dimensional stability. The binders and surfactants which now remain in the green body are burnt out at 600° C. for 3 hours.

Vacuum sintering is carried out at a heating rate of 200 K/h up to 1675° C. and a hold time of 10 hours. The vacuum conditions are $10^{-5}$ to $10^{-6}$ mbar. HIPping is carried out at a heating rate of 300 K/min up to 1700° C. and a hold time of 10 hours under a pressure of 200 MPa.

Example 5

Production of a Transparent Ceramic Composed of Zn(Al,Y)$_2$O$_4$ by Uniaxial Pressing Powders having primary particles having diameters of <1 μm, preferably diameters of ≤250 nm, of ZnO, Al$_2$O$_3$ and Y$_2$O$_3$ are weighed out in a ratio corresponding to the target composition. After the addition of dispersants, the mixture is mixed with ethanol and Al$_2$O$_3$ balls in a ball mill for 10 hours.

After drying on a rotary evaporator, the powder is heated at 1200° C. in a pure Al$_2$O$_3$ container for 5 hours. The cooled powder is then mixed with dispersants, binders and sintering additives and again ethanol and Al$_2$O$_3$ balls in a ball mill for 12 hours. The milled suspension is either dried on a hotplate or on a rotary evaporator or granulated in a spray drier.

The powder is subsequently uniaxially pressed to form discs. The shapes are preferably such that at least one surface reproduces the contour of the finished lens. The pressure conditions are in the range from 10 to 50 MPa, and the pressing times range from a few seconds to 1 minute. The preshaped compact is repressed in a cold isostatic press using a pressing pressure of 100 to 300 MPa. The pressure transmission medium is water or oil.

Any binder present is subsequently burnt out in a first thermal step. The heating time is 1-3 hours at temperatures in the range from 600 to 1000° C. The burnt-out green body is subsequently sintered in a vacuum sintering furnace (reduced pressure: $10^{-5}$-$10^{-6}$ mbar), if desired in hydrogen or helium. The sintering temperatures and times depend on the sintering behaviour of the mixture, i.e. after the formation of the composition, a further densification to give a ceramic having few or no pores takes place. Sintering to give a virtually pore-free body is carried out at higher temperatures in the range from 1600 to 1800° C. for 2 to 10 hours.

In the subsequent hot isostatic pressing (HIP), the closed pores are eliminated; the HIP conditions are, for example, 1780° C.-2 h-Ar-200 MPa. Depending on the chemistry and the susceptibility of the system to reduction, the sample can be reoxidized in a further thermal step (e.g. 1000° C., 5 hours, $O_2$ stream) after the hot isostatic pressing.

Optically transparent and homogeneous bodies which can be processed further to produce lenses are obtained.

Example 6

Production of a Transparent Ceramic Composed of $(Mg,Zn)(Al,Gd)_2O_4$ by Uniaxial Pressing (with Reactive Sintering)

Powders having primary particles having diameters of <1 µm, preferably diameters of ≤250 nm, of MgO, ZnO, $Al_2O_3$ and $Gd_2O_3$ are weighed out in a ratio corresponding to the target composition. After the addition of dispersants, the mixture is mixed with ethanol and $Al_2O_3$ balls in a ball mill for 10 hours.

After drying on a rotary evaporator, the powder is heated at 1200° C. in a pure $Al_2O_3$ container for 5 hours. The cooled powder is then mixed with dispersants, binders and sintering additives and again ethanol and $Al_2O_3$ balls in a ball mill for 12 hours. The milled suspension is either dried on a hotplate or on a rotary evaporator or granulated in a spray drier.

The powder is subsequently uniaxially pressed to form discs. The shapes are preferably such that at least one surface reproduces the contour of the finished lens. The pressure conditions are in the range from 10 to 50 MPa, and the pressing times range from a few seconds to 1 minute. The preshaped compact is repressed in a cold isostatic press using a pressing pressure of 100 to 300 MPa. The pressure transmission medium is water or oil.

Any binder present is subsequently burnt out in a first thermal step. The heating time is 1-3 hours at temperatures in the range from 600 to 1000° C. The burnt-out green body is subsequently sintered in a vacuum sintering furnace (reduced pressure: $10^{-5}$-$10^{-6}$ mbar), if desired in hydrogen or helium. The sintering temperatures and times depend on the sintering behaviour of the mixture, i.e. after the formation of the composition, a further densification to give a ceramic having few or no pores takes place. Sintering to give a virtually pore-free body is carried out at higher temperatures in the range from 1600 to 1900° C. for 3 to 15 hours.

In the subsequent hot isostatic pressing (HIP), the closed pores are eliminated; the HIP conditions are, for example, 1700° C.-2 h-Ar-200 MPa. Depending on the chemistry and the susceptibility of the system to reduction, the sample can be reoxidized in a further thermal step (e.g. 1000° C., 5 hours, $O_2$ stream) after the hot isostatic pressing.

Optically transparent and homogeneous bodies which can be processed further to produce lenses are obtained.

What is claimed is:

1. A method for manufacturing an optoceramic having crystallites of the formula $A_xC_uB_yD_vE_zF_w$, whereby A and C are selected from the group consisting of $Li^+$, $Na^+$, $Be^{2+}$, $Mg^{2+}$, $Ca^{2+}$, $Sr^{2+}$, $Ba^{2+}$, $Al^{3+}$, $Ga^{3+}$, $In^{3+}$, $C^{4+}$, $Si^{4+}$, $Ge^{4+}$, $Sn^{2+/4+}$, $Sc^{3+}$, $Ti^{4+}$, $Zn^{2+}$, $Zr^{4+}$, $Mo^{6+}$, $Ru^{4+}$, $Pd^{2+}$, $Ag^{2+}$, $Cd^{2+}$, $Hf^{4+}$, $W^{4+/6+}$, $Re^{4+}$, $Os^{4+}$, $Ir^{4+}$, $Pt^{2+/4+}$, $Hg^{2+}$ and mixtures thereof, B and D are selected from the group consisting of $Li^+$, $Na^+$, $K^+$, $Mg^{2+}$, $Al^{3+}$, $Ga^{3+}$, $In^{3+}$, $Si^{4+}$, $Ge^{4+}$, $Sn^{4+}$, $Sc^{3+}$, $Ti^{4+}$, $Zn^{2+}$, $Y^{3+}$, $Zr^{4+}$, $Nb^{3+}$, $Ru^{3+}$, $Rh^{3+}$, $La^{3+}$, $Lu^{3+}$, $Gd^{3+}$ and mixtures thereof, E and F are selected mainly from the group consisting of the divalent anions of S, Se and O and mixtures thereof, x, u, y, v, z and w satisfy the following formulae $$0.125 < (x+u)/(y+v) \le 0.55 \quad z+w=4$$

and at least 95% by weight of said crystallites display symmetric, cubic crystal structures of the spinel type, with the proviso that when $A=C=Mg^{2+}$ and $B=D=Al^{3+}$, E and F cannot both be O, which comprises the following steps:

(1) production of a homogeneous powder mixture by mixing powder raw materials having an average primary particle diameter of 20 nm to 1 µm in accordance with a desired composition, optionally with addition of additives such as binders, sintering aids and dispersants in a solvent to form a slurry and drying said slurry to give a powder, (2) production of a preform from said powder obtained in step (1), (3) optionally burning-out of any dispersants and binders present from said preform at temperatures of 500 to 900° C., (4) sintering said preform at temperatures of 1400 to 1900° C. to obtain an optoceramic, (5) optionally pressure sintering said optoceramic obtained in step (4) at 1400 to 2000° C. under a pressure of 10 to 300 MPa, and (6) optionally oxidation of said optoceramic obtained in step (4) or (5) in a stream of $O_2$ at temperatures of up to 1000° C. for 5 to 10 hours in order to remove any discoloration which may occur.

2. The method of claim 1, wherein A and C are selected from the group consisting of $Mg^{2+}$, $Ca^{2+}$, $Sr^{2+}$, $Ba^{2+}$, $Sc^{3+}$, $Zn^{2+}$, $Cd^{2+}$, $Hf^{4+}$ and mixtures thereof.

3. The method of claim 1, wherein A and C are selected from the group consisting of $Mg^{2+}$, $Ca^{2+}$, $Sr^{2+}$, $Zn^{2+}$ and mixtures thereof.

4. The method of claim 1, wherein B and D are selected from the group consisting of $Mg^{2+}$, $Al^{3+}$, $Ga^{3+}$, $In^{3+}$, $Sc^{3+}$, $Zn^{2+}$, $Y^{3+}$, $Nb^{3+}$, $Ru^{3+}$, $Rh^{3+}$, $La^{3+}$, $Gd^{3+}$ and mixtures thereof.

5. The method of claim 1, wherein B and D are selected from the group consisting of $Al^{3+}$, $Ga^{3+}$, $In^{3+}$, $Y^{3+}$, $La^{3+}$, $Gd^{3+}$ and mixtures thereof.

6. The method of claim 1, wherein x, u, y and v satisfy the following relationship, $$0.4 < (x+u)/(y+v) \le 0.5.$$

7. The method of claim 1, wherein x, u, y and v satisfy the following relationship, $$0.45 < (x+u)/(y+v) \le 0.5.$$

8. The method of claim 1, wherein E and F comprise at least 95% divalent anions of S, Se and O and mixtures thereof.

9. The method of claim 1, wherein E and F comprise at least 98% divalent anions of S, Se and O and mixtures thereof.

10. The method of claim 1, wherein said optoceramic has a refractive index from 1.74 to 2.3.

11. The method of claim 1, wherein said optoceramic has a refractive index from 1.75 to 2.0.

12. The method of claim 1, wherein said optoceramic has an Abbe number from 50 to 70.

13. The method of claim 1, wherein said opticeramic has a stress-induced birefringence of <10 nm/cm.

14. The method of claim 1, wherein said optoceramic has a stress-induced birefringence of <5 nm/cm.

15. The method of claim 12, wherein said powder raw materials have an average primary particle diameter of 20 to 500 nm.

16. The method of claim 12, wherein said optional pressure sintering of step 5 is performed under a pressure of 50 to 250 MPa.

17. The method of claim 12, wherein said optional pressure sintering of step 5 is performed under a pressure of 100 to 200 MPa.

18. The method of claim 12, wherein said optoceramic has a transparency of >80% in a window having a width of at least 200 nm in the region of visible light having wavelengths from 380 nm to 800 nm at a sample thickness of 2 mm.

* * * * *

UNITED STATES PATENT AND TRADEMARK OFFICE
CERTIFICATE OF CORRECTION

PATENT NO. : 8,679,996 B2  
APPLICATION NO. : 12/948933  
DATED : March 25, 2014  
INVENTOR(S) : Yvonne Menke et al.

Page 1 of 1

It is certified that error appears in the above-identified patent and that said Letters Patent is hereby corrected as shown below:

Title Page, Item (56) References Cited, OTHER PUBLICATIONS,
line 2, "ZnAl2O4" should be -- $ZnAl_2O_4$ --.

Title Page (page 2), Item (56) References Cited, OTHER PUBLICATIONS,
line 2, "La2Hf2O7:Tb" should be -- $La_2Hf_2O_7$:Tb --.
line 7, "La2Hf2O7:Ti4+" should be -- $La_2Hf_2O_7$:$Ti^{4+}$ --.
Line 10, "La2Hf2O7-Based" should be -- $La_2Hf_2O_7$-Based --.
Line 11, "ZnAl2O4" should be -- $ZnAl_2O_4$ --.

In the Claims

Column 12,
Line 65 (Claim 15), "claim 12" should be -- claim 1 --.

Column 13,
Line 1 (Claim 16), "claim 12" should be -- claim 1 --.
Line 4 (Claim 17), "claim 12" should be -- claim 1 --.
Line 7 (Claim 18), "claim 12" should be -- claim 1 --.

Signed and Sealed this  
Sixteenth Day of September, 2014

Michelle K. Lee  
*Deputy Director of the United States Patent and Trademark Office*